United States Patent

[11] 3,595,121

[72] Inventor Ronald G. Magers
Chicago, Ill.
[21] Appl. No. 858,293
[22] Filed Sept. 16, 1969
[45] Patented July 27, 1971
[73] Assignee Sears, Roebuck and Co.
Chicago, Ill.

[54] EDUCATIONAL TOY
6 Claims, 5 Drawing Figs.
[52] U.S. Cl. ................................................ 84/470,
84/330, 84/420, 84/402, 46/175
[51] Int. Cl. .............................................. G09b 15/00
[50] Field of Search .................................. 84/330,
380, 384, 402, 406, 411, 420, 470; 46/175, 117,
177—179, 189

[56] References Cited
UNITED STATES PATENTS
| | | | |
|---|---|---|---|
| 1,309,915 | 7/1919 | Siegel | 84/470 |
| 1,374,240 | 4/1921 | Schultz | 84/470 |
| 2,396,250 | 3/1946 | Clayman | 84/420 |
| 2,610,441 | 9/1952 | Unger | 46/175 |
| 2,713,805 | 7/1955 | Flores | 84/402 |
| 2,788,696 | 4/1957 | Anthony | 84/402 |
| 3,047,670 | 7/1962 | Gardner | 46/117 |
| 3,131,590 | 5/1964 | Lee | 84/330 |
| 3,221,443 | 12/1965 | Goddard | 46/191 |

*Primary Examiner*—Richard B. Wilkinson
*Assistant Examiner*—Lawrence R. Franklin
*Attorney*—McDougall, Hersh, Scott and Ladd

ABSTRACT: An educational toy construction comprising a body portion supporting a plurality of different sound producing elements. An opening is defined in the interior of the body portion, and an access slot is provided for receiving a record. The sound track on the record instructs the user of the toy regarding the manner of producing the various sounds and also provides information relative to the character of the sounds produced.

PATENTED JUL 27 1971 3,595,121
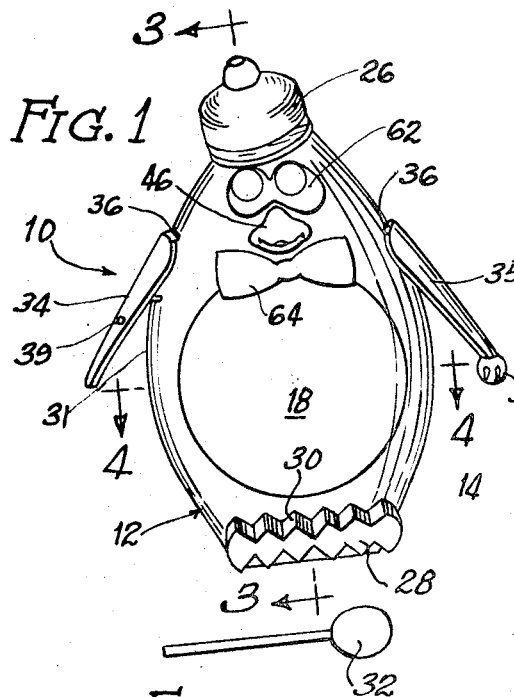
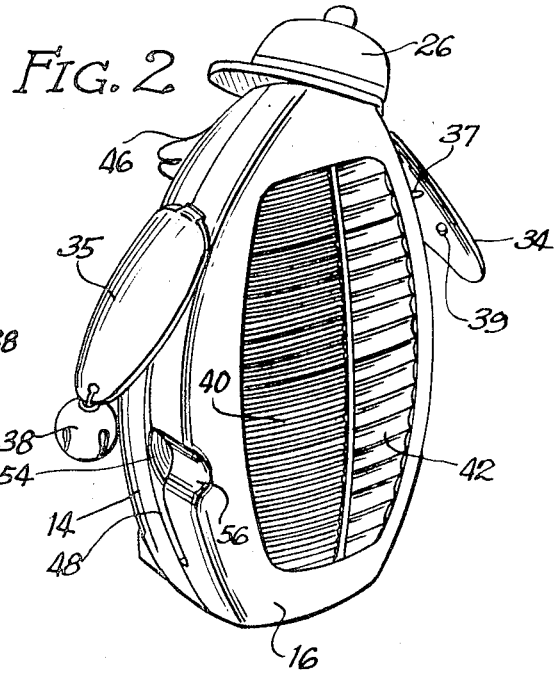
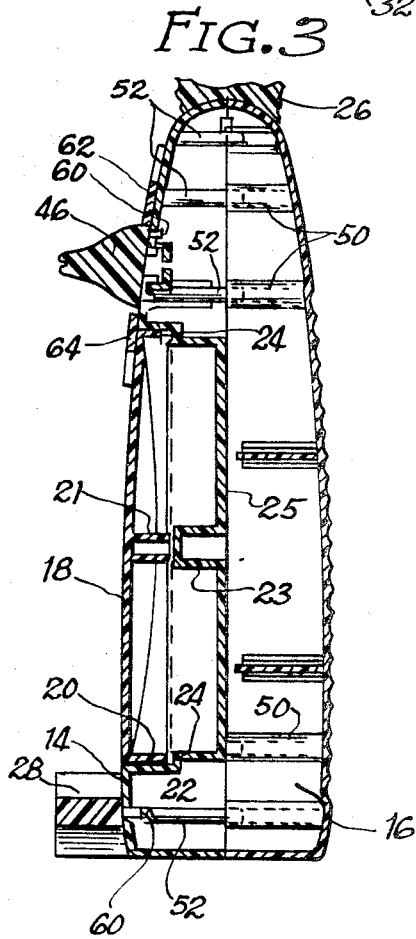
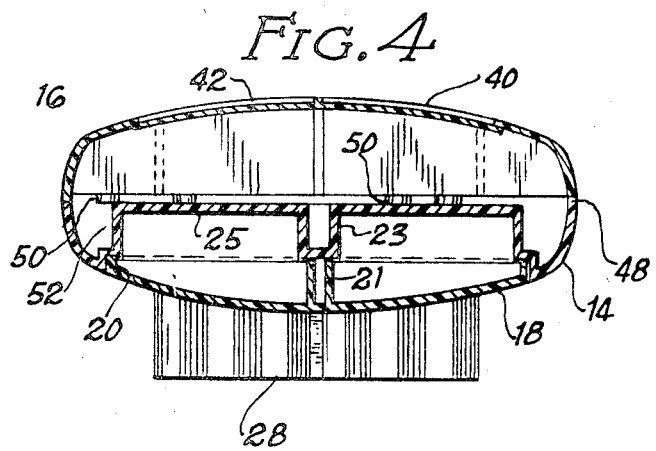
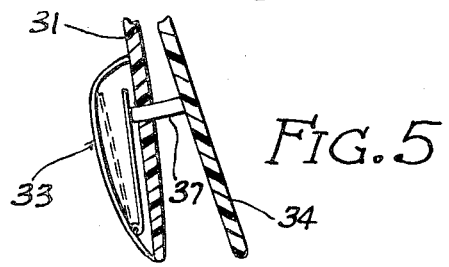
INVENTOR
Ronald G. Magers
by McDougall, Hersh, Scott
and Ladd
Attys

EDUCATIONAL TOY

This invention relates to an educational toy construction. The invention is particularly concerned with a toy construction which enables the user to produce a plurality of different sounds.

In the education of children, it is very desirable to teach them to distinguish between different sounds. Such different sounds can obviously be produced in a random fashion; however, the educational process is enhanced if a basis is provided for comparison.

Educational techniques which are designed solely for teaching purposes can often be boring to small children. It is, therefore, also desirable to provide a means for accomplishing the above described purposes which also hold the interest of a child.

It is a general object of this invention to provide a toy construction which includes a variety of sound producing devices so that the child using the toy will have a basis for distinguishing between different sounds.

It is a more specific object of this invention to provide a toy construction of the type described which also includes a record having a sound track which will enable the child to produce sounds on a systematic basis, and which will provide an explanation regarding distinguishing characteristics of the different sounds.

These and other objects of this invention will appear hereinafter and for purposes of illustration, but not of limitation, a specific embodiment of the invention is shown in the accompanying drawing wherein:

FIG. 1 is a perspective view of the educational toy of the invention;

FIG. 2 is a rear perspective view of the toy;

FIG. 3 is a vertical sectional view taken about the line 3-3 of FIG. 1;

FIG. 4 is a horizontal, sectional view taken about the line 4-4 of FIG. 1; and,

FIG. 5 is an enlarged, fragmentary, sectional illustration on the sound producing element of the construction.

The toy construction of this invention comprises a body portion which includes means for supporting a plurality of sound producing devices. The construction is particularly characterized by the location of sound producing devices on a body portion which represents the body of an animal. The sound producing devices are located in positions representing parts of the animal's body such as the head, legs, arms and stomach.

The body portion is characterized by a record receiving opening in its interior, and an access slot in its sidewall. With this arrangement, the toy can be purchased along with a record which has a sound track specifically relating to to the sounds which can be produced. The educational process is accomplished when the child using the toy plays the record and produces sounds in accordance with instructions on the record.

The drawings illustrate a toy construction 10 which consists of a body potion 12. The body portion comprises a front section 14 and a rear section 16. These front and rear sections provide means for attaching and supporting the sound producing devices referred to.

The sound producing devices consist of a drum 18 which occupies the central area of the body portion and which can be referred to as the stomach of the caricature. As best shown in FIG. 3, the drum is provided with inwardly extending sides 20 which are received in a recessed area of corresponding size defined by the body portion 14. This recessed area includes sidewalls 22 having a shoulder portion 24 which receives the sides 20 for locating the drum relative to the body portion.

A centrally located post 21 is associated with the drum and is aligned with the post 23 formed in the bottom wall 25 of the recessed area. This arrangement prevents inadvertent buckling of the material forming the drum. A suitable adhesive may be utilized for holding the drum in position relative to the sidewalls 22 and the shoulders 24.

The body portion is also provided with a "hat" 26 which preferably comprises a bell. The "feet" 28 on the body portion define corrugated surfaces 30 which can be used for producing sound by running the striker 32 across the corrugated surface. This striker is also used for beating the drum 18 and for sounding the bell 26.

Attached at each side of the body portion are arms 34 and 35. The arm 34 is pivotally connected at 36, and when the arm is pushed in, it produces an additional sound. This is accomplished by providing a rod 37 on the arm which extends through an opening in the sidewall 31 of the body portion. The rod engages a conventional "cricket" device 33 which makes the clicking sound. A bell 38 is attached at the end of the other arm 35 to provide an additional tinkling sound when that arm is moved.

The arm 34 may also have an opening 39 which serves to hold the handle of the striker 32. This simplifies packaging of the construction.

The back portion 16 of the construction defines a pair of panels 40 and 42 which have different corrugated surfaces. The corrugations 40 are relatively fine while the corrugations 42 are coarse, and movement of the striker element 32 over these corrugations results in the production of different types of sound.

The "nose" 46 consists of a conventional whistle to produce still another sound. It will be appreciated that use of the various devices will result in the production of a wide variety of sounds, and the sound producing devices are all incorporated in a single body and are all readily accessible by means of the striker element 32.

One sidewall of the construction defines a slot 48 which is dimensioned to receive a record. The sound track on the record is provided for purposes of instructing a child playing with the toy so that an educational advantage can be achieved. Specifically, the record will refer the child to designated areas of the construction in terms recognizable by the child. For example, the record may instruct the child to strike the caricature in the stomach and the record will then indicate to the child that a drum sound is being produced. The record can then proceed in any desired sequence to instruct the child to employ the striker or his fingers whereby a variety of other sounds can be produced. In each instance, a short statement regarding the characteristics of a particular sound can be set forth on the record.

The body sections 14 and 16 are preferably secured together in the manner shown in FIG. 3. The body section 16 carries a plurality of hollow pegs 50 which receive pins 52 carried by the body section 14. The pins 52 are preferably press-fit into the bores of the pegs 50 to rapidly secure the body sections together.

The hollow pegs 50 serve an additional function in that they support the record 54 within a space defined between the body portions 14 and 16. Thus, the record can be completely inserted between the body portions and the pegs 50 provided the necessary support for the record. A recess 56 is defined by the body portion 16 to permit finger gripping of the record 54 for removal of the record from between the body portions.

The hat 26, the nose 46 and the feet 28 may be attached to the body portions by providing pegs 60 which extend into openings in the wall of the body portions. Other pieces, for example the eyes 62 and the tie 64 may be attached to the body portion, for example by gluing. Obviously, other caricatures may be utilized in accordance with the principles of this invention to provide a sound producing device and an associated record.

It will be understood that various changes and modifications may be made in the above described construction which provide the characteristics of this invention.

That which we claim is:

1. An educational toy construction comprising a caricature, a plurality of different sound producing devices associated with the construction, said sound producing devices being located in commonly known positions on said caricature and being exposed on the exterior of the caricature, said construction consisting of opposing, substantially hollow sections, a slot defined by the construction and extending into the open interior of said construction between said hollow sections, and a record dimensioned to be received by said slot for storage within said construction, the record having a sound track for instructing a person using the toy regarding the manner of producing sounds with the toy, and said record including a statement regarding the characteristics of the sound produced, a recess defined by one of said hollow sections in the stomach position of the caricature, said sound producing devices including a drum structure occupying the recess defined in the stomach position, and including pivotally mounted arms attached to the sides of said body portion with each arm being adapted to produce additional sounds, at least one of said arms carrying a rod extending into the body portion, and including a clicking means actuated by said rod upon pivoting of said one arm.

2. A construction in accordance with claim 1 including a bell attached at the head portion of the caricature.

3. A construction in accordance with claim 1 including a bell attached to the other pivoting arm whereby the bell can be rung upon movement of said other arm.

4. A construction in accordance with claim 1 including a corrugated structure located in the feet area of the caricature whereby sounds can be produced by moving a solid striker over the corrugated structure.

5. A construction in accordance with claim 1 wherein the back panel of said construction includes a pair of corrugated surfaces adapted to make sounds when a solid striker element is moved over the corrugated surfaces.

6. A construction in accordance with claim 1 including a nose on the caricature, said nose comprising a whistle.